I. E. WHITNEY.
ACCELERATOR PEDAL FOR AUTOMOBILES.
APPLICATION FILED SEPT. 23, 1919.
1,344,466. Patented June 22, 1920.
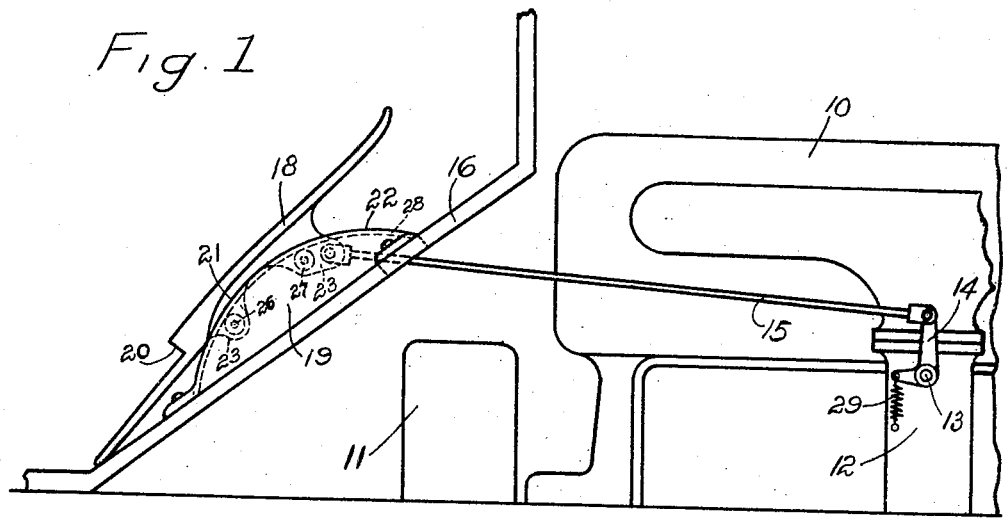
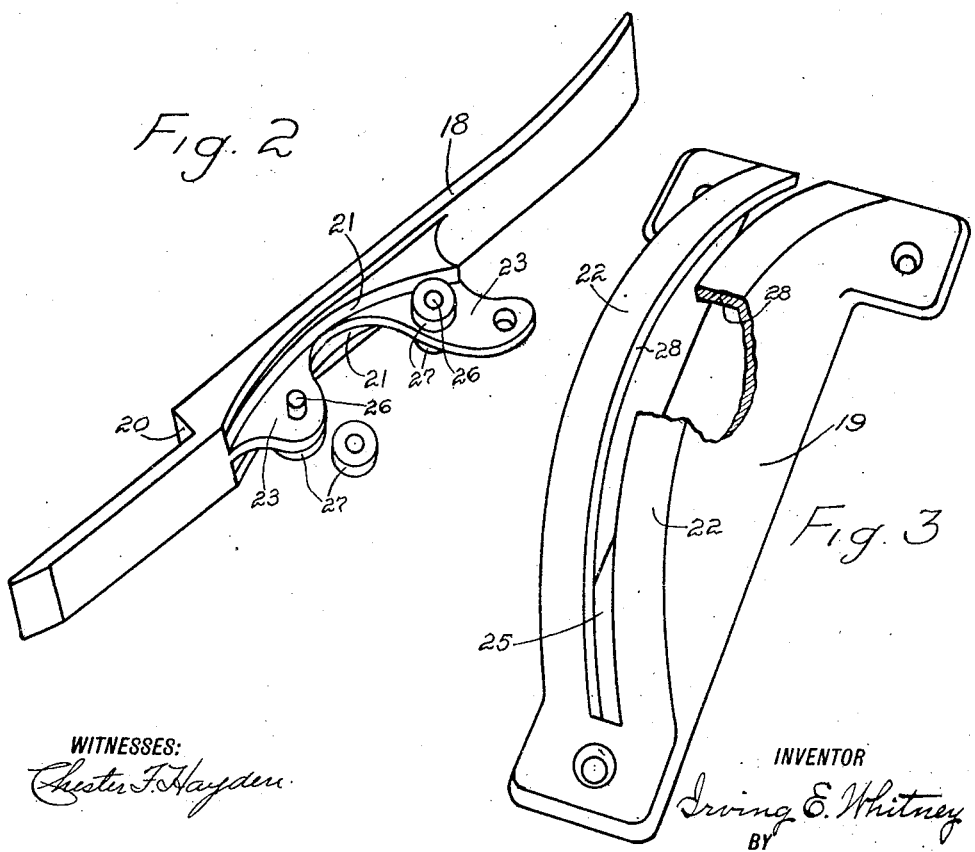
WITNESSES:
Chester F. Hayden
INVENTOR
Irving E. Whitney
BY
A. M. Wooster
ATTORNEY

UNITED STATES PATENT OFFICE.

IRVING E. WHITNEY, OF WEST NORWALK, CONNECTICUT.

ACCELERATOR-PEDAL FOR AUTOMOBILES.

1,344,466.

Specification of Letters Patent. Patented June 22, 1920.

Application filed September 23, 1919. Serial No. 325,636.

*To all whom it may concern:*

Be it known that I, IRVING E. WHITNEY, a citizen of the United States, residing at West Norwalk, Connecticut, county of Fairfield, State of Connecticut, have invented an Improvement in Accelerator-Pedals for Automobiles, of which the following is a specification.

This invention has for its object to provide a pedal adapted for various uses and especially adapted for use in all classes and styles of automobiles as a means of controlling the throttle valve, the special objects being to provide a pedal which may be operated with an easy, rocking movement of the foot, will provide a solid support for the foot at all times, will relieve the ankle and leg muscles from strain, and will obviate the fluctuations in the supply of gas to the engine which have been unavoidable, with the various accelerator pedals heretofore in use, whenever the car passed over a depression, or over a stone or other obstruction in the road.

With these and other objects in view I have devised the novel accelerator pedal which I will now describe, referring to the accompanying drawing forming a part of this specification and using reference characters to indicate the several parts.

Figure 1 is a side elevation of so much of an automobile as is necessary to illustrate the application thereto of my novel accelerator pedal;

Fig. 2 a perspective view on an enlarged scale of the pedal, detached, and

Fig. 3 is a perspective view, partly broken away, of the slotted arc plate, detached.

10 denotes the cylinders of an automobile engine, 11 the fly wheel, 12 the throttling chamber, 13 the shaft of the throttle valve (usually of the butterfly type) which has a bell crank lever 14 extending therefrom, 15 the accelerator rod, one end of which is pivoted to the bell crank lever, and 16 the toe board of an automobile body having an opening, not shown, through which the other end of the accelerator rod passes. These parts may all be of any ordinary or preferred construction, the special details of construction being wholly unimportant so far as the present invention is concerned.

My invention comprises a pedal 18 and an arc plate 19 upon which it may oscillate. The special configuration of the pedal is not of the essence of the invention. It should be provided with a shoulder 20 against which the front of the heel of the operator's shoe may bear and the forward end is preferably curved more or less to correspond approximately with the curvature of a shoe sole. The underside of the pedal is provided with curved bearing surfaces 21, the curves being arcs of a circle corresponding with the bearing surfaces 22 of the arc plate. Between bearing surfaces 21 are ribs or fins 23 which are adapted to travel in a longitudinal slot 25 between bearing surfaces 22 on the arc plate. Each of the ribs carries a cross pin 26 on the ends of which are mounted anti-friction rollers 27 which are adapted to travel on the underside of the flanges 28 of the arc plate. The forward end of accelerator rod 15 is pivoted to the forward rib as clearly indicated by dotted lines in Fig. 1. The parts are normally retained in the position shown in Fig. 1 by means of a spring 29, one end of which is connected to a fixed part and the other to bell crank lever 14. It will of course be understood that the normal supply of gas to the engine is controlled from the steering column and has nothing to do with the present invention which relates only to acceleration of the engine in starting, hill climbing and in the control of the car under conditions of traffic congestion.

It will be noted that this construction enables the operator to keep his foot upon the accelerator pedal as comfortably as if it were resting on the toe board. It provides a perfectly firm support for the foot, will not tire the ankle and leg muscles and will avoid the fluctuations in the supply of gas which are unavoidable with any accelerator pedal now in use. To increase the supply of gas the operator pushes his foot forward and causes the pedal to oscillate on the arc plate. Forward movement of the pedal, through the accelerator rod, will act to open the throttle valve. The instant the operator relieves the forward pressure of his foot on the pedal, or removes his foot therefrom, spring 29 will return the throttle valve and likewise the pedal to its normal position as in Fig. 1.

In assembling, the pedal, with the rollers in place, is slipped in from the front and the arc plate is secured to the toe board by screws or bolts.

Having thus described my invention, I claim:

1. A device of the character described comprising an arc plate having a longitudinal slot on the opposite sides of which are flanges, the outer faces of the flanges comprising arc shaped bearing surfaces, and a pedal having corresponding arc shaped bearing surfaces and having between said surfaces a rib adapted to travel in the slot of the arc plate.

2. A device of the character described comprising an arc plate having a longitudinal slot on the opposite sides of which are flanges, the outer faces of the flanges comprising arc shaped bearing surfaces, and a pedal having corresponding arc shaped bearing surfaces and having between said surfaces ribs which are adapted to travel in the slot in the arc plate, and rollers carried by the ribs which are adapted to engage the underside of the flanges of the arc plate.

3. The combination with the throttle valve of an engine, a spring controlled bell crank lever secured to the valve shaft and an accelerator rod connected to said lever, of a slotted arc plate and a pedal having corresponding arc shaped bearing surfaces and a rib passing through the slot in the arc plate to which the accelerator rod is connected.

4. The combination with the throttle valve of an engine, a spring controlled bell crank lever secured to the valve shaft and an accelerator rod connected to said lever, of an arc plate having a longitudinal slot on the opposite sides of which are flanges, the outer faces of the flanges forming bearing surfaces, a pedal having corresponding arc shaped bearing surfaces and a rib passing through said slot and connected to the accelerator rod, and rollers carried by said rib and adapted to engage the underside of the flanges of the arc plate.

In testimony whereof I affix my signature.

IRVING E. WHITNEY.